United States Patent [19]

Nakajima et al.

[11] Patent Number: 5,194,999
[45] Date of Patent: Mar. 16, 1993

[54] VIDEO RECORDING AND PLAYBACK APPARATUS WITH AUTOMATIC NORMAL AND PREPROGRAMMED MODE DATA ENTRY SELECTION

[75] Inventors: Katsumi Nakajima; Yutaka Suzuki, both of Nagaokakyo, Japan

[73] Assignee: Mitsubishi Denki Kabushiki Kaisha, Tokyo, Japan

[21] Appl. No.: 577,529

[22] Filed: Sep. 5, 1990

[30] Foreign Application Priority Data

Sep. 8, 1989 [JP] Japan .................................. 1-234445

[51] Int. Cl.⁵ ............................................ G11B 33/00
[52] U.S. Cl. ........................................ 360/69; 360/61; 360/137
[58] Field of Search ........................... 360/69, 137, 61

[56] References Cited

U.S. PATENT DOCUMENTS 4,139,872  2/1979  Tachi .................................. 360/72.3

FOREIGN PATENT DOCUMENTS 0198658  10/1986  European Pat. Off. .
2918846   8/1981  Fed. Rep. of Germany .
3138280   6/1982  Fed. Rep. of Germany .
3139577   7/1982  Fed. Rep. of Germany .
1566490   9/1977  United Kingdom .
2193403   2/1988  United Kingdom .

OTHER PUBLICATIONS

Product Manual, SL-HF3000, Sony Corporation.
IEEE Transactions on Consumer Electronics article entitled: "A Programmable TV Receiver", N. Kokado et al.; Feb. 1976; pp. 69-83.

Primary Examiner—Joseph L. Dixon
Assistant Examiner—David L. Robertson

[57] ABSTRACT

A video magnetic recording and playback device has a manual input device for manually inputting data, a memory timer for storing the manually input data as preset data, and an operation controller responsive to the manually input data for controlling a video signal recording and playback unit and a tape travel controller and also responsive to the preset data for controlling the operation of the video signal recording and playback unit and the tape travel controller for preset recording. A state detector detects whether the device is in a playback state or in a stop state. By the action of a switch in accordance with the detected state, when the device is in the playback state, the manually input data is directed to the operation controller and is used for controlling the video signal recording and playback unit and the travel speed controller. When the device is in the stop state, manually input data is directed to the memory timer and stored in the memory timer as the preset data.

14 Claims, 4 Drawing Sheets

VIDEO RECORDING AND PLAYBACK APPARATUS WITH AUTOMATIC NORMAL AND PREPROGRAMMED MODE DATA ENTRY SELECTION

FIELD OF THE INVENTION

The present invention relates to a video tape recorder (VTR) and more particularly to a video magnetic recording and playback device which permits selection of the playback state by means of shuttle and jog switches and permits timer presetting by means of the same switches.

BACKGROUND OF THE INVENTION

FIG. 3 is a block diagram showing a VTR which is an example of a conventional video magnetic recording and playback device. In the figure, a video signal recording and playback means 9 records video signals on a magnetic tape 1 or reads video signals from the magnetic tape 1 by means of a rotary magnetic head 7 on a rotary drum 6. A tape travel control means 8 controls a capstan 4, a supply reel 2 and a take-up reel 3 and causes the magnetic tape 1 to travel at a constant speed. An operation control means 10 performs selection between recording and playback, and supplies the video signal recording and playback means 9 with a recording and playback control signal 11 for changing the playback state, and supplies the tape travel control means 8 with a tape travel speed control signal 12 for selecting the tape travel speed. A memory timer means 13 has a memory timer mechanism, and permits external presetting of recording and playback time, and later produces the stored contents as an operation control signal 14 for controlling preset recording or preset playback.

A shuttle switch 16 is a rotary switch which can be manually turned clockwise and counterclockwise within a certain limit, e.g., within 180 degree from a reference position (center position or 0° position), and outputs specific codes, shown in FIG. 4 at (a), corresponding to the switch position. A jog switch 17 is also a rotary switch which can be manually turned clockwise or counterclockwise, without limit, and outputs a pulse signal, shown in FIG. 4 at (b), each time it is rotated a predetermined angle, e.g., 90 degrees. An encoder 18 encodes the output from the shuttle switch 16, and, only at one reference position, e.g., the center position (0° position), of the shuttle switch 16, encodes the pulse signal from the jog switch 17 and outputs the encoded data as the jog-shuttle data 19.

A playback control mode selecting switch 23 is closed in the playback control mode and is opened in the presetting mode. A timer presetting mode selecting switch 24, on the other hand, is closed in the presetting mode and is opened in the playback control mode.

The shuttle switch 16 and the jog switch 17 are used for two purposes. When the playback mode selecting switch 23 is closed and the presetting mode selecting switch 24 is opened, the data from the shuttle switch 16 and the jog switch 17 are supplied to the operation control means 10, and the shuttle switch 16 and the jog switch 17 are used for controlling the playback operation. When the presetting mode selecting switch 24 is closed and the playback control selecting switch 23 is opened, the data from the shuttle switch 16 and the jog switch 17 are supplied to the memory timer means 13, and the shuttle switch 16 and the jog switch 17 are used for inputting the present data.

Further details of the manipulation of the switches in the playback control mode is given below:

The playback can be performed in various modes including Forward Slow Playback, Forward Normal-speed Playback, Forward Double Playback, Reverse Slow Playback, Reverse Normal-speed Playback, Reverse Double Playback, and Still/Frame Advancement Playback. To select one of these modes, the shuttle switch is rotated to the corresponding position. The relationship between the position of the shuttle switch 16 and the selected mode of playback is as follows:

| Position (Range of Angles) | Selected Mode of Playback |
|---|---|
| +10° to +20° | Forward Slow Playback |
| +20° to +30° | Forward Normal-speed Playback |
| +30° to +40° | Forward High-speed Playback |
| −10° to −20° | Reverse Slow Playback |
| −20° to −30° | Reverse Normal-speed Playback |
| −30° to −40° | Reverse High-speed Playback |
| 0° | Still/Frame Advance Playback |

Here, the sign "+" indicates the angle attained when the shuttle switch is rotated clockwise from a reference position, i.e., the center position (0°), while the sign "−" indicates the angle attained when the shuttle switch is rotated counterclockwise from the reference position.

When the shuttle switch 16 is at the center position, the Still Playback for reproducing a still picture is performed. When the jog switch 17 is also manipulated, Frame Advance Playback is effected. That is, each time the jog switch 17 is rotated by one click the picture is advance by one frame. The direction of advancement is forward when the jog switch 17 is rotated clockwise, and is backward when the jog switch 17 is rotated counterclocksise.

In this way, the mode of playback and hence the speed of the playback is decided on the basis of the range of angle in which the shuttle switch 17 is set at.

The shuttle switch 16 produces data indicating its position, which is supplied to the encoder 18, from which the playback control signal 21 for designating Forward Slow, Forward Normal-speed Playback, Forward High-speed (e.g., Double-speed) Playback, Reverse Slow, Reverse Normal-speed Playback, Reverse High-speed (e.g., Double speed) Playback, or Still/Frame Advance Playback is produced and supplied to the operation control means 10.

When the shuttle switch 16 is at the reference position, and the jog switch 17 is rotated, a pulse signal is supplied to the encoder 18 each time the jog switch 17 is rotated a predetermined angle, e.g., 90 degree. The pulse signal from the jog switch 17 is encoded, and a playback control signal 21 for Frame Advance Playback is supplied from the encoder 18 to the operation control means 10. During Frame Advance Playback, one pulse signal from the jog switch 17 causes the advancement of the picture by one frame.

In accordance with the playback control signal 21, the operation control means 10 supplies the video signal recording and playback means 9 with the recording and playback control signal 11 to select the playback state, and supplies the tape travel control means 8 with the tape travel speed control signal 12 to select the tape travel speed to perform Forward Slow Playback, Forward Normal-speed Playback, Forward High-speed Playback, Reverse Slow Playback, Reverse Normal-speed Playback, Reverse High-speed Playback, or Still/Frame Advance Playback.

Manipulation of the switches in the presetting mode will now be described in detail.

This presetting is made while the VTR is in the stop state. In this mode, the item on which presetting is to be preset is selected by manipulation of the shuttle switch 16. The items for presetting may, for example, include the following:
Channel Number (of which a program is to be recorded)
Date (on which recording is to be made)
Starting Hour (at which the recording is to be started)
Starting Minute (at which the recording is to be started)
Ending Hour (at which the recording is to be ended)
Ending Minute (at which the recording is to be ended)
These items are selected in turn by the following manipulation of the shuttle switch. Assuming a first item, e.g., the Channel Number, is being selected, if the shuttle switch is rotated from the reference position clockwise to a predetermined angle, e.g., 15°, i.e., one click, and is returned to the reference position, then a next succeeding item, e.g., the Date, is selected. If the shuttle switch is again rotated clockwise, by the same predetermined angle and then returned, the next item, e.g., the Starting Hour is selected. When the preceding item needs to be selected, the shuttle switch 16 is rotated by a predetermined angle counterclockwise, and then returned to the reference position.

While each item is selected, the setting of a numerical value, such as the numerical indication of the channel number, date, or starting hour, for the item is input by means of the jog switch 17. Before the manipulation of the setting is begun, an arbitrarily value is given, (For instance, the value which was set in the last presetting is given). Starting with this initial value, the numerical value is incremented or decremented by manipulation of the jog switch 17. Each time the jog switch 17 is rotated clockwise by the predetermined angle, the value is incremented. Each time the jog switch 17 is rotated counterclockwise by the predetermined angle, the value is incremented.

The numerical values for the respective items are supplied, as the presetting data 22, to the memory timer means 13 and stored.

More specifically, responsive to the manipulation of the shuttle switch 16, the code indicating the selected item is produced by the encoder 18, and is supplied through the presetting mode selecting switch 24 to the memory timer means 13. When the shuttle switch 16 is fixed at the reference position and the jog switch 17 is rotated so that for rotation of each predetermined angle, a pulse signal is output to the encoder 18 and is encoded, and the presetting data 22 for setting the numerical value, such as recording and playback time, is supplied from the encoder 18 to the memory timer means 13.

Once the presetting has been made, the memory timer means 13 keeps comparing the current time as counted by the internal timer mechanism (built within the memory timer means 13) with the starting time (date, hour and minute) stored in the memory timer 13 and when they coincide, it issues a start command signal, which is then supplied to the operation control means 10, together with other data such as the data indicating the channel of which a program is to be recorded. In accordance with these data, the operation control means 10 controls the video signal recording and playback means 9 and the tape travel control means 8 to cause starting of the recording.

While a program is being recorded, the memory timer means 13 keeps comparing the current time as counted by the internal timer mechanism with the ending time (hour and minute) stored in the memory timer 13, and when they coincide, it issues a stop signal, which is then supplied to the operation control means 10. In accordance with this stop signal, the operation control means 10 controls the video signal recording and playback means 9 and the tape travel control means 8 to stop the recording. When the presetting step is manipulated to select Playback (rather than Recording), a similar control for starting and ending playback is performed by the action of the memory timer means 13, the operation control means 10, the video signal recording and playback means 9 and the tape travel control means 8.

The VTR in the prior art is constructed as described above, and mode selection switches 23 and 24 may have to be manipulated to alter the mode before using the shuttle switch and the jog switch for either of the two modes. The manipulation of the VTR is therefore troublesome.

SUMMARY OF THE INVENTION

The invention has been achieved to eliminate the above problems, and its object is to provide a magnetic recording and playback device with which it is not necessary to manipulate a switch for choosing the playback control mode or the presetting mode when the shuttle switch and the jog switch are used for the data input both in the playback control mode and in the presetting mode.

In a video magnetic recording and playback device according to the invention, a state detecting means is provided to detect whether the device is in a playback state or in a stop state, and a switch means is responsive to the detected state for directing the manually input data to the operation control means when the device is in the playback state so that the manually input data are used for the control of the video signal recording and playback means and the travel speed control means, and for directing the manually input data to the memory timer means when the device is in the stop state so that the manually input data are stored in the memory timer means as the preset data.

According to the invention, when the manual input means, such as shuttle and jog switches, are manipulated during playback, the manually input data are used for the control of playback, e.g., for changing the mode of playback, such as between Forward Slow Playback, Forward Normal-speed Playback, and the like. When the manual input means are manipulated when the device is in the stop state, the manually input data are stored in the memory timer means as preset data so that presetting is made.

Thus the same manual input means may be manipulated, and yet they can be used for different purposes. The necessity to manipulate switches for selection of functions of the manual input means has therefore been eliminated.

BRIEF DESCRIPTION OF THE DRAWINGS

The present invention will become more fully understood from the detailed description given hereinbelow and the accompanying drawings which are given by way of illustration only, and thus, are not limitative of the present invention and wherein.

DETAILED DESCRIPTION OF THE PREFERRED EMBODIMENTS

An embodiment of the invention will now be described with reference to the drawings.

Figure 1:
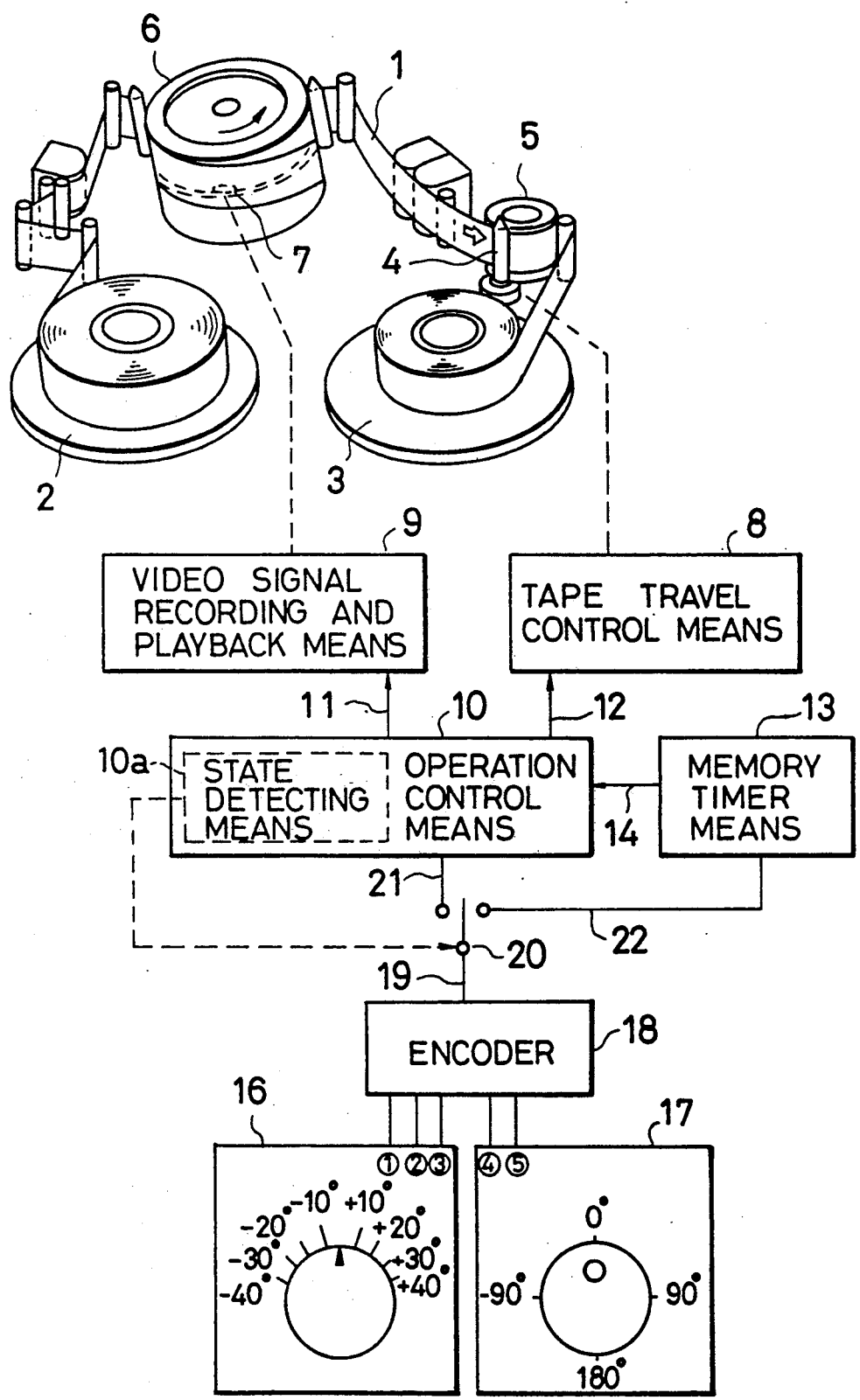
FIG. 1 is a block diagram showing a configuration of the magnetic recording and playback device of an embodiment of the invention.

FIG. 1 shows the configuration of the VTR according to an embodiment of the invention. In the figure, the reference numerals identical to those in FIG. 3 denote identical components, and their description is omitted. As will be seen, the VTR of this embodiment is similar to the VTR of FIG. 3 in the prior art. But there are the following differences, as will be apparent from the following description.

Figure 3:
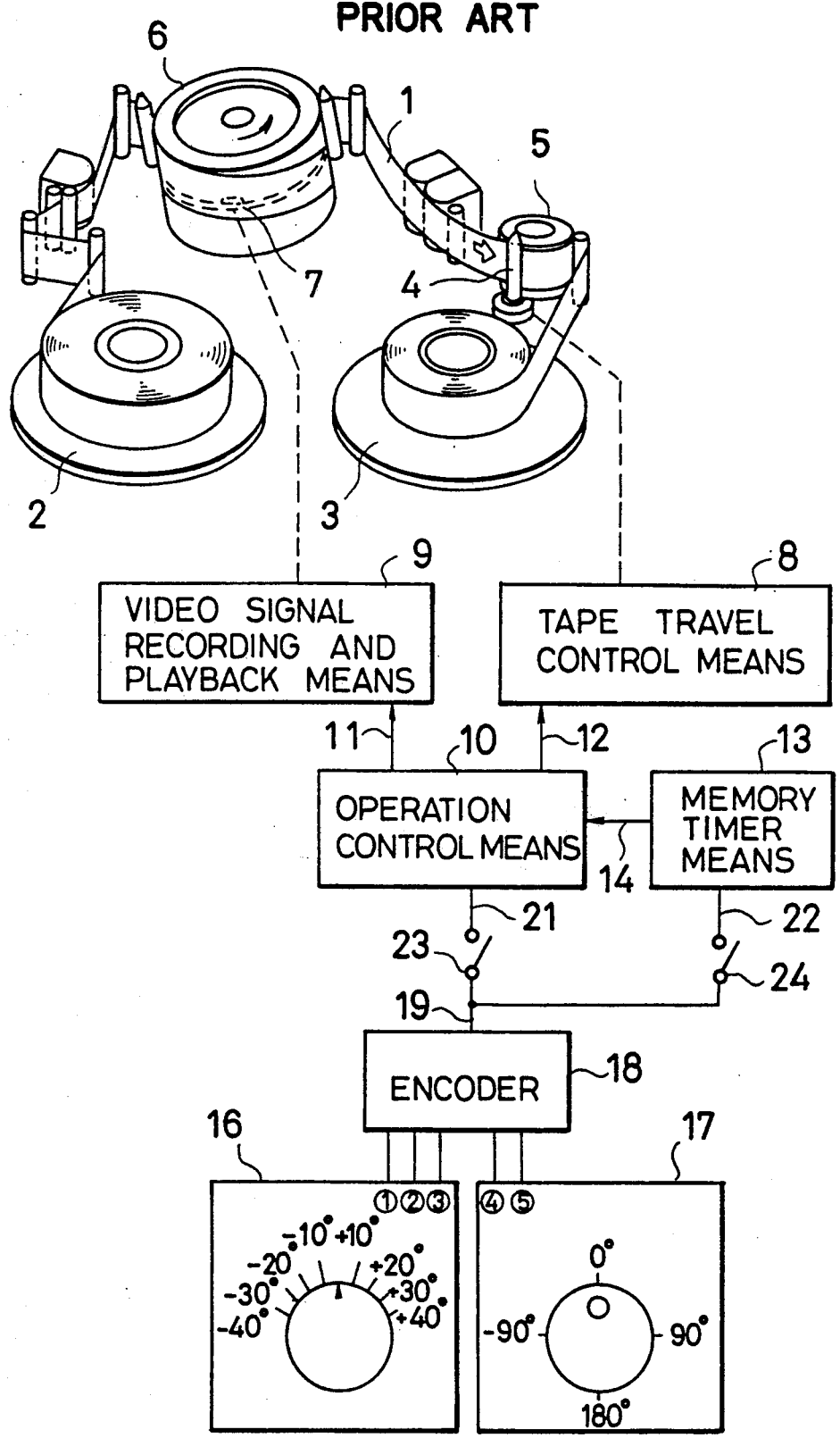
FIG. 3 is a block diagram showing the configuration of a prior art magnetic recording and playback device.
Figure 4A:
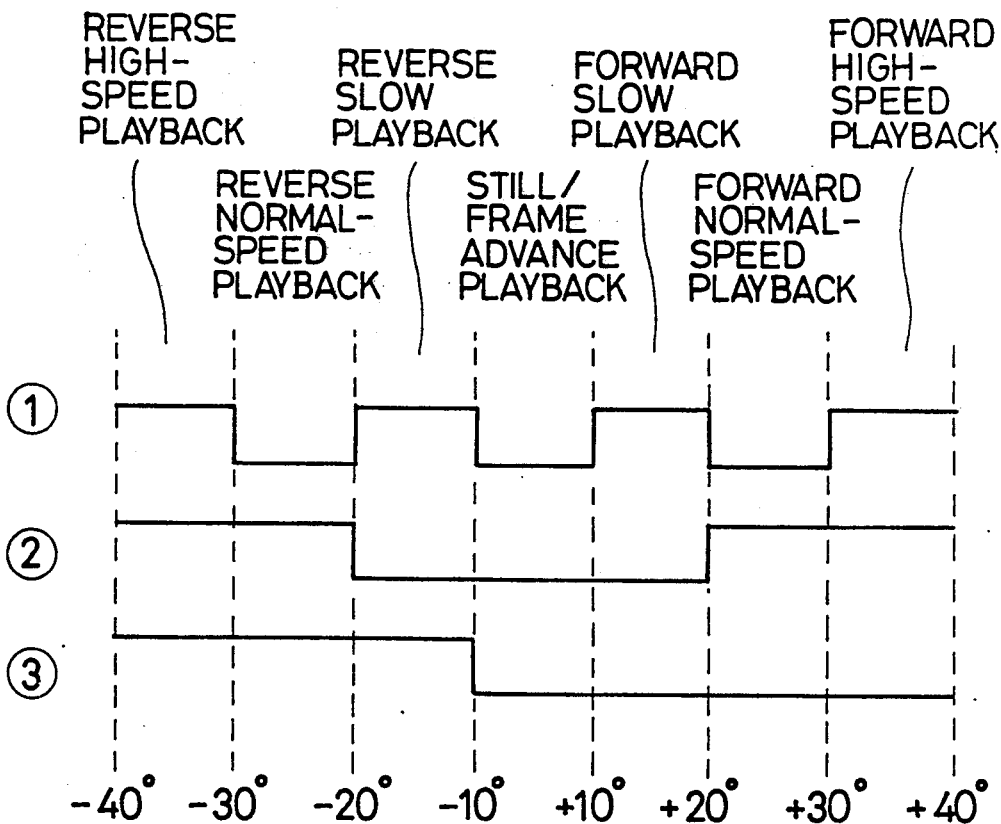
FIGS. 4a and 4b is a diagram showing the waveforms of the output pulses from the shuttle and jog switches.
Figure 4B:
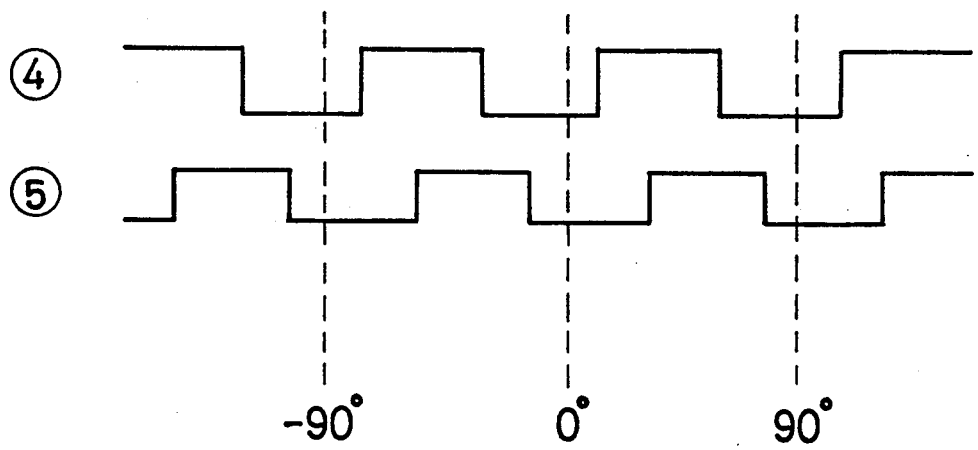

Similar to the VTR shown in FIG. 3, the VTR of this embodiment comprises a video signal recording and playback means 9 for recording video signals on a magnetic tape 1 and playing back video signals from the magnetic tape 1. A tape travel control means 8 controls the travel speed of the magnetic tape 1. The control means 8 selects the travel speed of the tape 1 from a plurality of speeds, which for instance include a speed for Forward Slow Playback, a speed for Forward Normal-speed Playback, a speed for Forward High-speed playback, a speed for Reverse Slow Playback, a speed for Reverse Normal-speed playback, and a speed for Reverse High-speed playback. The travel control means 8 is also capable of causing move and stop operation of the tape 1 for Frame-Advance playback.

A manual input means comprising a shuttle switch 16 and a jog switch 17 is for manually inputting data is included. The shuttle switch 16 and the jog switch 17 may be similar to those described with reference to FIG. 3. An encoder 18 is provided in association with the shuttle switch 16 and the jog switch 17 to produce a code corresponding to the position of the shuttle switch 16 and pulse signals from the jog switch 17.

There is also provided a means, such as a manually operated switch (not shown), for initiating a playback operation.

A memory timer means 13 stores the manually input data as preset data.

An operation control means 10 is responsive to the manually input data and controls the video signal recording and playback means 9 for controlling recording and playback and the tape travel control means 8 for controlling the speed of the tape 1. When preset recording or playback is to be effected, the operation control means 10 is responsive to the preset data and controls, in accordance with the preset data, the operation of the video signal recording and playback means 9 and the tape travel control means 8.

A difference of this embodiment from the configuration shown in FIG. 3 is that a state detecting means 10a is provided in the operation control means 10 for detecting whether the VTR is in a playback state or in a stop state. This detection is made for instance by referring to data or a flag stored in a memory, not shown as such, provided in the operation control means 10, which indicates the state of the operation of the VTR.

A switch means 20 is provided to be controlled by the state detecting means 10a and connects the outputs of the encoder 18 either to the input of the operation control means 10 when the VTR is in the playback state, or to the input of the memory timer means 13 when the VTR is in the stop state. When the output of the encoder 18 is connected to the input of the operation control means 10, the output of the encoder 18 is directed to the operation control means 10 so that the manually input data are used for the control of the video signal recording and playback means 9 and the travel speed control means 8. When the output of the encoder 18 is connected to the input of the memory timer means 13, the output of the encoder 18 is directed to the memory timer means 13 so that the manually input data are stored in the memory timer means as the preset data.

The manually input data supplied to the memory timer means 13 comprise data for preset recording including the time (date, hour, minute) of starting the preset recording, the time (hour and minute) of ending the preset recording, and channel number of which a program is to be recorded.

The manually input data supplied to the operation control means 10 comprises data for selecting the mode of playback from among Forward Slow Playback, Forward Normal-speed Playback, Forward High-speed Playback, Reverse Slow Playback, Reverse Normal-speed Playback, and Reverse High-speed Playback, and Still/Frame-Advance Playback.

Figure 2:
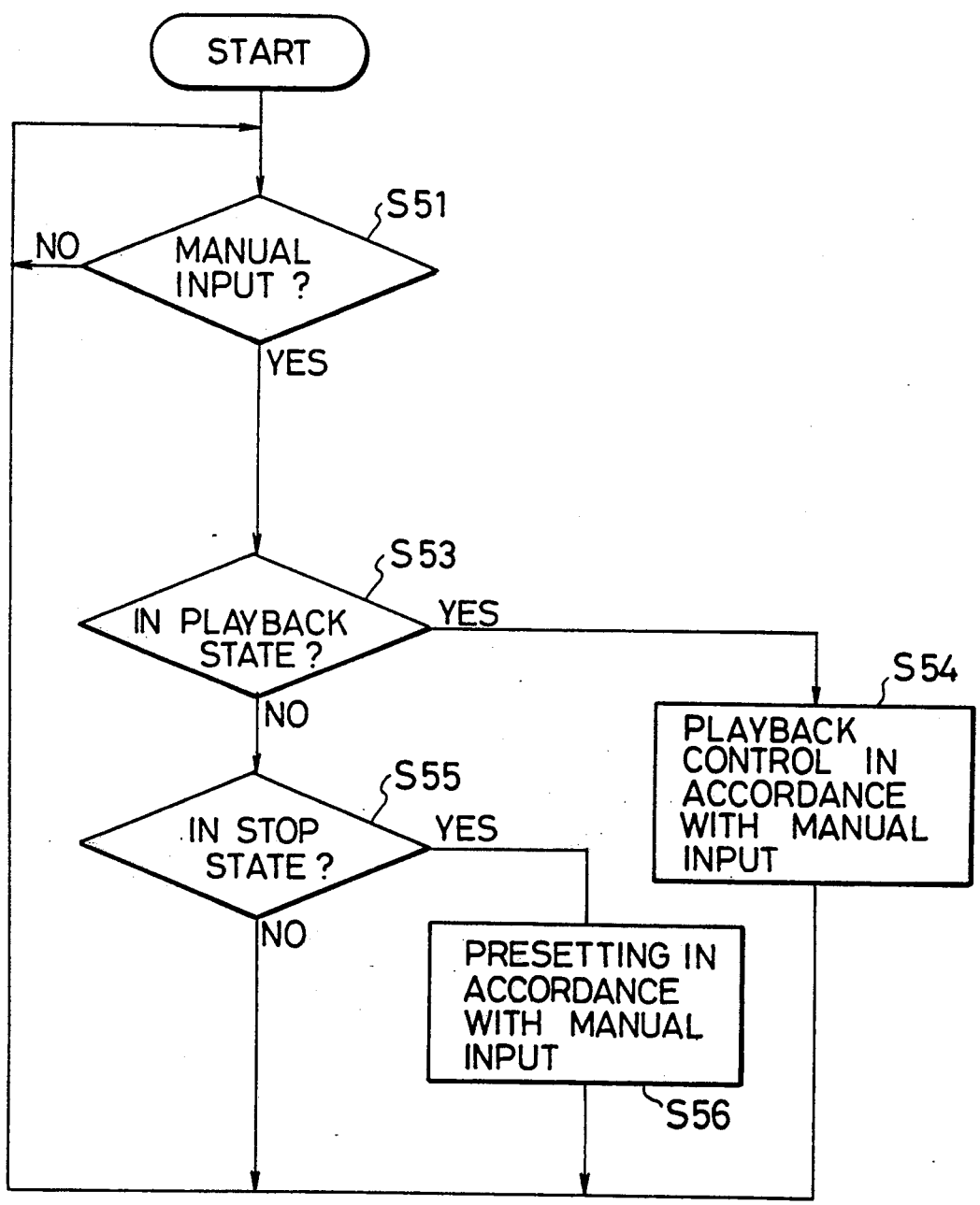
FIG. 2 is a flowchart for explaining the operation of the device.

The above configuration can be implemented, for instance, by use of a programmed microcomputer, and its operation is described with reference to the flowchart of FIG. 2.

First, decision is repeatedly made by means of the operation control means 10 whether or not a manual switch input by the jog and shuttle switches 16 and 17 (step 51) has been made. Upon finding of such input, decision is made by means of the operation control means 10 whether the VTR is in the playback state or not (step 53). If the VTR is found to be in the playback state, in accordance with the data input by the jog and shuttle switches 16 and 17, playback operation is controlled (step 54). If the VTR is not in the playback state, decision is made whether or not it is in the stop state (step 55). If it is in the stop state, the data input by the jog and shuttle switches 16 and 17 (step 51) are supplied to the memory timer means 13 so as to be stored in the memory timer means 13. Thus presetting is made (step 56). The manner of manipulating the jog and shuttle switches 16 and 17 are identical to those described with reference to the prior art shown in FIG. 3.

If at the step 56, the VTR is not found to be in the stop state, the next manual input by use of the jog and shuttle switches 16 and 17 input is waited for.

With the above operation, it is not necessary to manipulate a separate switch for the selection of the playback control or the presetting, but the state of the VTR is detected, and selective use of the data input by the jog and shuttle switches 16 and 17 is made automatically, and the manipulation of the switches is facilitated.

As has been described, according to the invention, the user is released from the trouble of selecting the function selecting means, when the shuttle and jog switches are manipulated, and yet the shuttle and jog switches can be used for multiple purposes. Moreover, since the function selecting means can be omitted, the structure of the device can be simplified.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A video magnetic recording and playback device comprising:

video signal recording and playback means for recording video signals on a magnetic tape and for playing back video signals from the magnetic tape;

tape travel control means for controlling travel speed of the magnetic tape;

manual input means for manually inputting data;

memory timer means for storing the manually input data as preset data;

operation control means, responsive to the manually input data, for controlling said video signal recording and playback means and said tape travel control means, said operation control means being responsive to said preset data for controlling the operation of said video signal recording and playback means and said tape travel control means during present recording;

state detecting means for detecting whether the device is in a playback state or in a stop state; and switch means, responsive to said state detecting means, for directing the manually input data to said operation control means when the device is in the playback state so that the manually input data is used to control said video signal recording and playback means and said travel speed control means and for directing the manually input data to said memory timer means when the device is in the stop state so that the manually input data is stored in said memory timer means as said preset data.

2. The video magnetic recording and playback device of claim 1, wherein said manual input means comprises:

shuttle switch means, rotatable through a predetermined angle, for producing a signal corresponding to a rotary position thereof; and jog switch means, which is rotatable and effective only when said shuttle switch means is in a reference position, for outputting a pulse for each rotation through a predefined angle.

3. The video magnetic recording and playback device of claim 2, further comprising:

an encoder coupled to said shuttle switch means and said jog switch means, for producing a code corresponding to the position of said shuttle switch means and said pulse from said jog switch means.

4. The video magnetic recording and playback device of claim 2, wherein the manually input data supplied to said memory timer means comprises data for preset recording including a starting time for the preset recording, an ending time for the preset recording, and a channel number of a program to be recorded.

5. The video magnetic recording and playback device of claim 1, wherein the manually input data supplied to said operation control means comprises data for selecting the mode of playback including Still/Frame Advance playback, Slow playback, Normal-speed playback, and High-speed playback.

6. The video magnetic recording and playback device of claim 1, wherein said travel control means selects the travel speed of the magnetic tape from a plurality of speeds.

7. The video magnetic recording and playback device of claim 6, wherein said plurality of speeds includes a speed for Slow playback, a speed for Normal-speed playback, and a speed for High-speed playback.

8. A video recording/reproduction apparatus operable in a normal mode and a preprogrammed mode, comprising:

video recording/reproducing means for recording video signals on a recording medium and for reproducing video signals recorded on the recording medium;

recording medium control means for directing transport of the recording medium;

speed and direction input means, for inputting user operation data of the video recording/reproduction apparatus, said speed and direction input means including plural transport speed settings for both forward and backward transport directions;

memory means for storing the operation data, during the preprogrammed mode, as preset operation data which is indicative of a specific preprogrammed operation of the video recording/reproduction apparatus;

control means for controlling said video recording/reproducing means and said recording medium control means during operation in the normal mode in accordance with the user operation data from said speed and direction input means and during operation in the preprogrammed mode in accordance with the preset operation data stored in said memory means, said control means comprising reproduction/standby detection means, for determining when said video recording/reproducing means is reproducing video signals from the recording medium and when the recording medium is stopped and the video recording/reproduction apparatus is in a standby state; and normal/preprogrammed mode selection means, coupled to said control means, for directing the operation data from said speed and direction input means to said control means when said reproduction/standby detection means determines that said video recording/reproducing means is reproducing video signals and to said memory means for storage as the preset operation data when said reproduction/standby detection means determines that the recording medium is stopped.

9. The video recording/reproduction apparatus of claim 8, wherein said speed and direction input means comprises:

shuttle switch means, rotatable through a predetermined angle, for producing a signal corresponding to a rotary position thereof; and jog switch means, which is rotatable and effective only when said shuttle switch means is in a reference position, for outputting a pulse for each rotation of a predefined angle.

10. The video recording/reproduction apparatus of claim 9, further comprising:

an encoder coupled to said shuttle switch means and said jog switch means, for producing a code corresponding to the position of said shuttle switch means and said pulse from said jog switch means.

11. The video recording/reproduction apparatus of claim 9, wherein the operation data supplied to said memory means comprises data for a specific preprogrammed operation including a starting time for the preprogrammed operation, an ending time for the preprogrammed operation, and a channel number of a program to be recorded.

12. The video recording/reproduction apparatus of claim 8, wherein the operation data supplied to said control means comprises data for selecting the mode of playback including Still/Frame Advance playback, Slow playback, Normal-speed playback, and High-speed playback.

13. The video recording/reproduction apparatus of claim 8, wherein said plural transport speed settings include a speed for Slow playback, a speed for Normal-speed playback, and a speed for High-speed playback.

14. The video recording/reproduction apparatus of claim 8, wherein the recording medium is magnetic tape.

* * * * *